United States Patent
Kim

(10) Patent No.: US 9,031,555 B2
(45) Date of Patent: May 12, 2015

(54) PLMN SELECTION METHOD AND APPARATUS IN PORTABLE TERMINAL

(75) Inventor: Hyun Jung Kim, Bucheon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 466 days.

(21) Appl. No.: 13/008,336

(22) Filed: Jan. 18, 2011

(65) Prior Publication Data

US 2011/0177810 A1 Jul. 21, 2011

(30) Foreign Application Priority Data

Jan. 18, 2010 (KR) .................. 10-2010-0004314

(51) Int. Cl.
*H04W 4/00* (2009.01)
*H04W 48/18* (2009.01)

(52) U.S. Cl.
CPC .................................... *H04W 48/18* (2013.01)

(58) Field of Classification Search
CPC .................................. H04W 4/00; H04M 4/00
USPC ...................................................... 455/432.1
See application file for complete search history.

(56) References Cited

U.S. PATENT DOCUMENTS

| | | | |
|---|---|---|---|
| 6,697,629 B1* | 2/2004 | Grilli et al. | 455/456.1 |
| 7,197,312 B2* | 3/2007 | Gunaratnam et al. | 455/445 |
| 2002/0147012 A1* | 10/2002 | Leung et al. | 455/433 |
| 2002/0197992 A1* | 12/2002 | Nizri et al. | 455/435 |
| 2003/0112778 A1* | 6/2003 | Lundby | 370/335 |
| 2003/0161285 A1* | 8/2003 | Tiedemann et al. | 370/332 |
| 2004/0137930 A1* | 7/2004 | Kim et al. | 455/517 |
| 2004/0203744 A1* | 10/2004 | Hicks et al. | 455/432.1 |
| 2004/0224716 A1* | 11/2004 | Choi | 455/522 |
| 2005/0009551 A1* | 1/2005 | Tsai et al. | 455/522 |
| 2005/0070283 A1* | 3/2005 | Hashimoto et al. | 455/435.1 |
| 2005/0227720 A1* | 10/2005 | Gunaratnam et al. | 455/510 |
| 2005/0245278 A1* | 11/2005 | Vannithamby et al. | 455/522 |
| 2006/0264215 A1* | 11/2006 | Ekstedt et al. | 455/435.2 |
| 2007/0298801 A1* | 12/2007 | Kim et al. | 455/436 |
| 2009/0170507 A1* | 7/2009 | Kim | 455/433 |

* cited by examiner

*Primary Examiner* — Charles Shedrick
(74) *Attorney, Agent, or Firm* — Jefferson IP Law, LLP

(57) ABSTRACT

A Public Land Mobile Network (PLMN) selection method in a roaming portable terminal and an apparatus thereof are provided. The PLMN selection method includes, determining whether a registered PLMN being a finally registered PLMN is valid when a PLMN selection event occurs, determining whether there is a stored Active PLMN list when the registered PLMN is invalid, selecting a PLMN using the active PLMN list when there is the stored Active PLMN list, and camping on a specific cell of the selected PLMN. Since the portable terminal does not attempt to register in an HPLMN when a PLMN selection event occurs, the portable terminal can be rapidly and efficiently registered in a suitable PLMN.

17 Claims, 4 Drawing Sheets

PLMN SELECTION METHOD AND APPARATUS IN PORTABLE TERMINAL

PRIORITY

This application claims the benefit under 35 U.S.C. §119(a) of a Korean patent application filed on Jan. 18, 2010 in the Korean Intellectual Property Office and assigned Serial No. 10-2010-0004314, the entire disclosure of which is hereby incorporated by reference.

BACKGROUND OF THE INVENTION

1. Field of the Invention

The present invention relates to a Public Land Mobile Network (PLMN) selection method and an apparatus thereof. More particularly, the present invention relates to a PLMN selection method for rapidly and efficiently selecting a PLMN when a PLMN selection event occurs in a Roaming state, and an apparatus thereof.

2. Description of the Related Art

When a Public Land Mobile Network (PLMN) selection event occurs in a portable terminal, the portable terminal preferentially selects a registered PLMN (referred to as 'RPLMN' hereinafter) stored in a Subscriber Identification Module (SIM) to attempt registration. The RPLMN is a PLMN in which a portable terminal is finally registered. When the RPLMN does not exist or the portable terminal cannot be registered in the RPLMN, the portable terminal selects a Home PLMN (HPLMN) or an Equivalent HPLMN (EHPLMN) to attempt registration. The HPLMN is a PLMN that a user joins, and the EHPLMN is a PLMN that is equivalent to the HPLMN at the time of selecting the PLMN. For example, the EHPLMN can be a PLMN contracting Roaming agreement with the HPLMN.

When the portable terminal is not registered in the HPLMN or the EHPLMN, the portable terminal selects a PLMN by referring to a preferred PLMN list stored in order to have a priority in the SIM by a user or network operator to attempt registration.

For example, when the preferred PLMNs are stored in an order of A-B-C-D, the portable terminal selects a PLMN A according to priority. When the PLMN A is not selected to be greater than a preset Received Signal Strength Indication (RSSI), a PLMN B being second in order is selected. When all the preferred PLMNs are not selected, the portable terminal randomly selects one of scanned PLMNs.

The PLMN selection procedure according to the related art, as described above, preferentially attempts registration in the HPLMN or the EHPLMN when the RPLMN does not exist or the portable terminal is not registered in the RPLMN. However, when a PLMN selection event occurs in a Roaming state, the HPLMN does not exist in a real field. The PLMN selection procedure according to the related art attempts registration in the HPLMN that does not exist in a real field when the PLMN selection event occurs. This increases battery consumption speed and results in unnecessary time consumption at the time of selecting the PLMN. Upon selecting the PLMN, the PLMN selection procedure according to the related art randomly selects one PLMN when priority does not exist or when the PLMNs have the same priority, to attempt registration. When the registration is not achieved, the PLMN selection procedure according to the related art selects another PLMN to attempt the registration. The PLMN selection procedure attempts the registration by selecting the PLMN one by one which results in unnecessary time consumption and battery consumption speed.

SUMMARY OF THE INVENTION

An aspect of the present invention is to address at least the above-mentioned problems and/or disadvantages and to provide at least the advantages described below. Accordingly, an aspect of the present invention is to provide a Public Land Mobile Network (PLMN) selection method in a portable terminal that may rapidly and efficiently select a suitable PLMN and not select an HPLMN when a PLMN selection event occurs in a Roaming state, and an apparatus thereof.

In accordance with an aspect of the present invention, a PLMN selection method in a roaming portable terminal is provided. The method includes, determining whether a registered PLMN being a finally registered PLMN is valid when a PLMN selection event occurs, determining whether there is a stored Active PLMN list when the registered PLMN is invalid, selecting a PLMN using the active PLMN list when there is the stored Active PLMN list, and camping on a specific cell of the selected PLMN.

In accordance with another aspect of the present invention, a PLMN selection apparatus in a roaming portable terminal is provided. The apparatus includes, a protocol processor for determining whether a registered PLMN being a finally registered PLMN is valid when a PLMN selection event occurs, for determining whether there is a stored Active PLMN list when the registered PLMN is invalid, for selecting a PLMN using the active PLMN list when the stored Active PLMN list exists, and for camping on a specific cell of the selected PLMN, and a radio frequency communication unit for transmitting a camp on request signal to the specific cell of the selected PLMN.

In the PLMN selection apparatus and method in a portable terminal, since the portable terminal does not attempt to register in an HPLMN when a PLMN selection event occurs, the portable terminal may be rapidly and efficiently registered in a suitable PLMN. Further, the present invention may prevent a PLMN absent in a field to be selected and registered to reduce battery consumption.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a portable terminal that is a Roaming portable terminal. However, it will be apparent that the portable terminal is applicable to various information and communication devices and multimedia devices such as a Smart phone, an International Mobile Telecommunication 2000 (IMT-2000) terminal, a Time Division Multiple Access (TDMA) terminal, a Global System for Mobile Communication (GSM) terminal, a Code Division Multiple Access (CDMA) terminal, a Universal Mobile Telecommunication Service (UMTS) terminal, a Wideband CDMA (WCDMA) terminal, and an application thereof.

Figure 1:
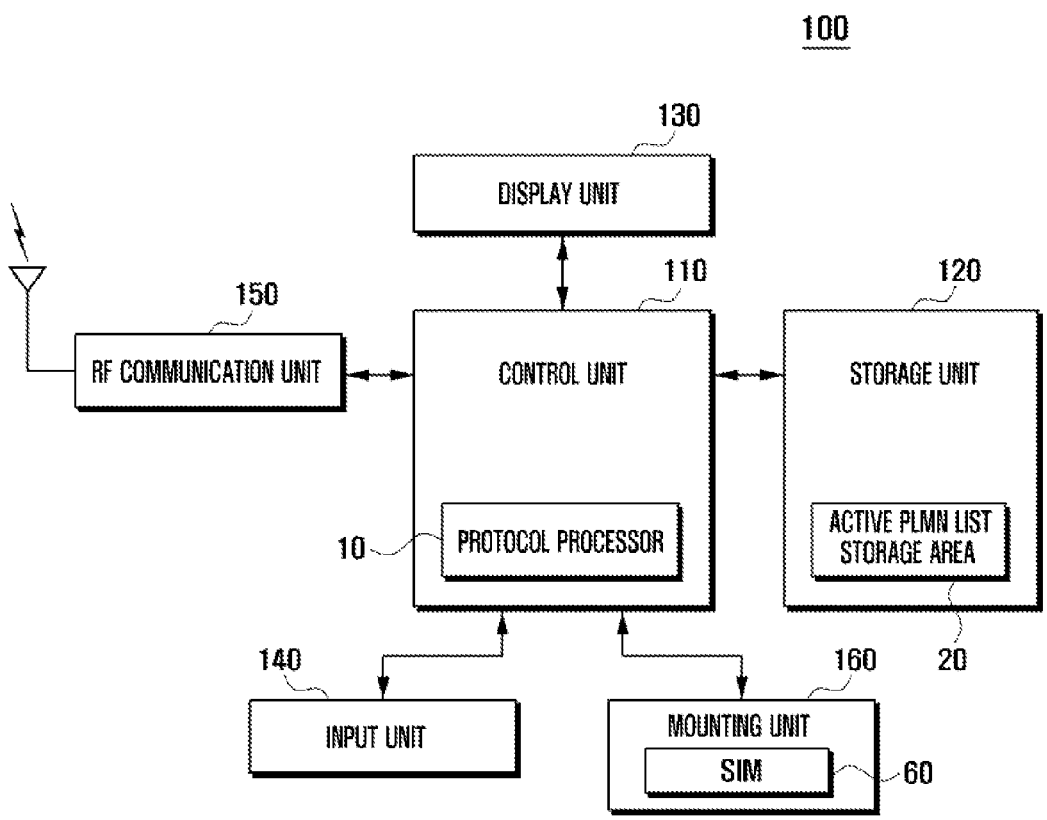
FIG. 1 is a block diagram illustrating a configuration of a portable terminal according to an exemplary embodiment of the present invention.
Figure 2:
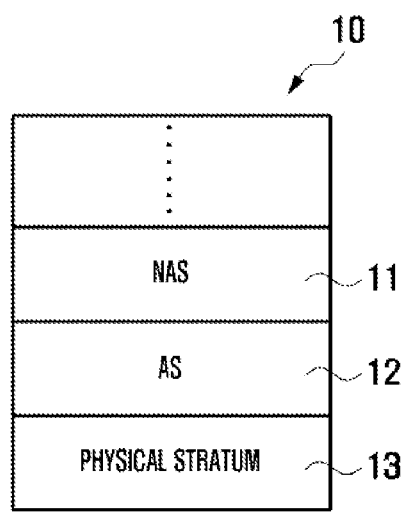
FIG. 2 is a block diagram illustrating a configuration of a protocol processor according to an exemplary embodiment of the present invention.

FIG. 1 is a block diagram illustrating a configuration of a portable terminal according to an exemplary embodiment of the present invention. FIG. 2 is a block diagram illustrating a configuration of a protocol processor according to an exemplary embodiment of the present invention Referring to FIG. 1 and FIG. 2, the portable terminal 100 according to an exemplary embodiment of the present invention may include a control unit 110, a storage unit 120, a display unit 130, an input unit 140, a Radio Frequency (RF) communication unit 150, and a mounting unit 160. The control unit 110 includes a protocol processor 10, the storage unit 120 includes an active Public Land Mobile Network (PLMN) list storage area 20, and the mounting unit 160 includes a Subscriber Identity Module (SIM) 60. Each element will be described in more detail below.

The input unit 140 may include an input key and a function key for receiving an input of numerals or various character information, for setting all types of functions and for controlling functions of the portable terminal 100. For example, the input unit 140 may include a call key for requesting a voice call, a video phone call key for requesting a video phone call, a termination key for requesting termination of the voice call or the video phone call, and a volume key for controlling an output volume of an audio signal. The input unit 140 may be configured by one or a combination of input devices such as a touch-pad, a touch screen, a button type key pad of a general key arrangement, a button type key pad of a QWERTY type, and the like.

The display unit 130 may display user data and function setting information input by a user or various information provided to the user as well as all types of menu screens. The display unit 130 may be configured by a Liquid Crystal Display (LCD), an Organic Light Emitting Diode (OLED), or an Active Matrix Organic Light Emitting Diode (AMOLED). When the display unit 130 is configured by a touch screen type, the display unit 130 may execute a function of the input unit 140.

The RF communication unit 150 may form a communication channel with a base station under the control of the control unit 110 to perform data and voice communication. The RF communication unit 150 may include an RF transmitter (not illustrated) for up-converting a frequency of a transmitted signal and amplifying the signal, and an RF receiver (not illustrated) for low-noise-amplifying a received signal and for down-converting the signal. Further, the RF communication unit 150 may detect frequencies distributed around the portable terminal 100 under the control of the control unit 110 to form a communication channel with the base station. In more detail, when the RF communication unit 150 is switched from a power off state to a power on state, the RF communication unit 150 is located in a zone where service is not possible or moves from the zone where service is not possible to a zone where service is possible, and may scan the periphery of the portable terminal 100 to detect frequencies provided from base stations. For example, the RF communication unit 150 may receive System Information (SI). The SI includes information such as PLMN codes and neighboring cell information broadcasted from a base station that the portable terminal 100 should recognize. The RF communication unit 150 may transmit a camp on request signal, a registration request signal, and a location information update request signal to the base station.

The SIM 60 is mounted in the mounting unit 160. The mounting unit 160 performs a function of a physical interface between the control unit 110 and the SIM 60. The SIM 60 may store user authentication information. Further, the SIM 60 may store a Home PLMN (HPLMN), an Equivalent HPLMN (EHPLMN), a Registered PLMN (RPLMN), or a preference PLMN list. Moreover, the SIM 60 may store a Man Machine Interface (MMI) PLMN code table. The MMI PLMN code table is a table storing PLMN information by countries. The MMI PLMN code table maps Plmn Network Name (PNN) to the PLMN code and stores the mapping result. Accordingly, the portable terminal 100 may output a mobile communication network operator name corresponding to an available PLMN scanned at the time of a PLMN passive selection on a display unit 130. To do this, the SIM 60 may store an Elementary File-Operator PLMN List (EF-OPL) and an EF-PNN. The EF-OPL and EF-PNN depends on a $3^{rd}$ Generation Partnership Project (3GPP) standard, and thus a detailed description thereof is appropriately omitted. More particularly, the SIM 60 according to an exemplary embodiment of the present invention may store an Active PLMN list. The Active PLMN list will be described in more detail below.

The storage unit 120 may store user data generated by a user and data to be transmitted or received as well as application programs necessary for a function operation according to an exemplary embodiment of the present invention. More particularly, the storage unit 120 may include an Active PLMN list storage area 20 for storing the Active PLMN list. Meanwhile, when the Active PLMN list is stored in the SIM 60, the storage unit 120 may not include the Active PLMN list storage area 20.

The Active PLMN list may store PLMN information, for example, a PLMN code being served in a corresponding country to efficiently select the PLMN at an international Roaming. The PLMN code may include at least one of a Mobile Country Code (MCC) and a Mobile Network Code (MNC). Further, the Active PLMN list may be stored by mapping valid an Absolute Radio Frequency Channel Number (ARFCN) by PLMNs. Accordingly, an Access Stratum (AS) 12 does not search all channels of a Broadcast Control Channel (BCCH) according to the ARFCN but searches all channels from a stored valid ARFCN to perform efficient BCCH searching. A valid ARFCN is stored in a Queue scheme. Namely, when a registered cell changes, an oldest valid ARFCN may be removed and a remaining valid ARFCN may be shifted to store a new valid ARFCN. To do this, the storage unit 120 may store an ActivePlmnSet function. The ActivePlmnSet function has a configuration as listed in Table 1.

For example, the number of the PLMNs and the number of valid ARFCNs stored in the Active PLMN list may be variously set according to a designer's intention in consideration of the performance and a mobile communication environment of the portable terminal 100.

A method for generating the Active PLMN list will be described below. When an MCC of a PLMN confirmed through SI decoding not to be registered in the RPLMN differs from an MCC of an HPLMN, and a priority in respective available PLMNs extracted through a frequency scan from the AS 12 is not defined or the PLMNs have the same priority, the AS 12 scans peripheral frequencies to generate an available PLMN list and add the generated available PLMN list to a RR_ACT_REJ, and transfer the available PLMN list to a Non-Access Stratum (NAS) 11. The NAS 11 stores the available PLMN list included in the RR_ACT_REJ in an Active PLMN list. The NAS 11 may further store PLMNs having the same MCC as that of a current PLMN by referring to an MMI PLMN code table used to display a network operator name in a Man Machine Interface (MMI). The Active PLMN list is stored in a non-volatile area (e.g., an Electrical Erasable Programmable Read-Only Memory (EEPROM)) of the storage unit 120 such that data may also

TABLE 1

```
#define LENGTH_OF_MCC               2
#define APS_MAX_NO_OF_PLMN          6
#define APS_MAX_NO_OF_ARFCN          12
typedef struct         t_plmn_selected
    {
    u8                 mcc [LENGTH_OF_MCC];
    u8                 mnc;
    MC_PCC_FILL_STRUCT1
    }
    T_plmn_selected;
typedef struct t_ActivePlmnSet
    {
    T_plmn_selected plmn [APS_MAX_NO_OF_PLMN]
    u8              arfcn [APS_MAX_NO_OF_PLMN][APS_MAX_NO_OF_ARFCN]
    u8              length
    }
    T_ActivePlmnSet;
```

Referring to Table 1, the ActivePlmnSet function may include a plmn[APS_MAX_NO_OF_PLMN] field and arfcn [APS_MAX_NO_OF_PLMN] [APS_MAX_NO_OF_ARFCN] field. The plmn[APS_MAX_NO_OF_PLMN] field is composed of PLMN codes constituting the ActivePlmnSet function. In this case, one ActivePlmnSet may store a maximum of 6 PLMN codes. The ActivePlmnSet function may be configured by PLMNs having the same MCC. In this case, a priority in respective PLMNs included in the ActivePlmnSet is not defined or the PLMNs have the same priority.

The arfcn[APS_MAX_NO_OF_PLMN][APS_MAX_ NO_OF_ARFCN] field may be a field containing main BCCH ARFCN information corresponding to each PLMN, and store a maximum of twelve ARFCNs per PLMN. Each time a cell changes, the arfcn[APS_MAX_NO_OF_PLMN] [APS_MAX_NO_OF_ARFCN] adds an ARFCN of a current camped cell, and an overall operation scheme is configured to be stored in a Queue scheme of a First In, First Out (FIFO).

The Active PLMN list generated through the ActivePlmnSet function may have a configuration of 6 rows and 12 columns. Namely, the Active PLMN list may store six PLMN information and twelve valid ARFCNs with respect to each PLMN. However, the present invention is not limited thereto.

maintain in a power off state of the portable terminal 100. The control unit 110 may control an overall operation of the portable terminal 100 and signal flow between internal blocks of the portable terminal 100, and includes a function of a data processor processing data transmitted and received from and by the RF communication unit 150. More particularly, when a PLMN selection event occurs in a Roaming state and the portable terminal 100 cannot camp on an RPLMN, the control unit 110 determines whether there is an Active PLMN list. If it is determined that there is an Active PLMN list, the control unit 110 may select a specific PLMN to be requested for registration and perform a protocol procedure for camping on a specific cell of the selected PLMN. To do this, the control unit 110 may include a protocol processor 10 for performing a protocol processing procedure. The protocol processor 10 may include a physical stratum 13, an AS 12, and a NAS 11.

The physical stratum 13 sets and maintains a physical link for data transmission, and cuts the physical link. The NAS 11 executes RF communication control and a mobile management function. More particularly, the NAS 11 according to an exemplary embodiment of the present invention generates an Active PLMN list. When a PLMN selection event occurs in a Roaming state, the NAS 11 transmits the Active PLMN list to the AS 12. After camping on a specific cell of a specific PLMN, when the NAS 11 receives the RR_ACT_CNF, the NAS 11 updates the Active PLMN list and performs a location information update procedure to finish a PLMN registration procedure of the portable terminal 100. When the portable terminal 100 moves to another country, namely, when the MCC changes, the NAS 11 may initialize the Active PLMN list and reconfigure the Active PLMN list using PLMN information serving in a corresponding country. Accordingly, the Active PLMN list is not fixed in a specific form but is dynamically changed according to a corresponding country. Accordingly, when a PLMN selection event occurs, the AS 12 may rapidly and efficiently select a suitable PLMN.

The AS 12 may scan frequencies and decode SI to camp on a specific cell of a specific PLMN. More particularly, the AS 12 according to an exemplary embodiment of the present invention may decode SI received through the RF communication unit 150 to extract a PLMN code, and determines whether a PLMN having the same PLMN code as the extracted PLMN code is included in the Active PLMN list. If it is determined that the PLMN having the same PLMN code as the extracted PLMN code is included in the Active PLMN list, the AS 12 may camp on a specific cell of a corresponding PLMN using ARFCN.

Meanwhile, although not illustrated in FIG. 2, the protocol processor 10 may further include an application program stratum (not illustrated) and a user interface stratum (not illustrated) according to a 3GPP standard. The portable terminal 100 according to an exemplary embodiment of the present invention may further include structural elements having additional functions such as a camera module for photographing images or for moving images, a near distance communication module for near distance RF communication, a broadcasting receiving module for receiving a broadcast, a digital sound source play module such as Moving Picture Expert Group (MPEG)-1 or 2 Audio Layer 3 (MP3) module, and an Internet communication module executing an Internet function according to a provision form. Since the structural elements may be variously modified according to a convergence trend of a digital device, all elements cannot be described. Structural elements equivalent to the foregoing structural elements may be included in the portable terminal 100 according to an exemplary embodiment of the present invention.

Respective constructions of a portable terminal 100 according to an exemplary embodiment of the present invention have been described above. A PLMN selection method of a portable terminal 100 according to an exemplary embodiment of the present invention is described below.

Figure 3:
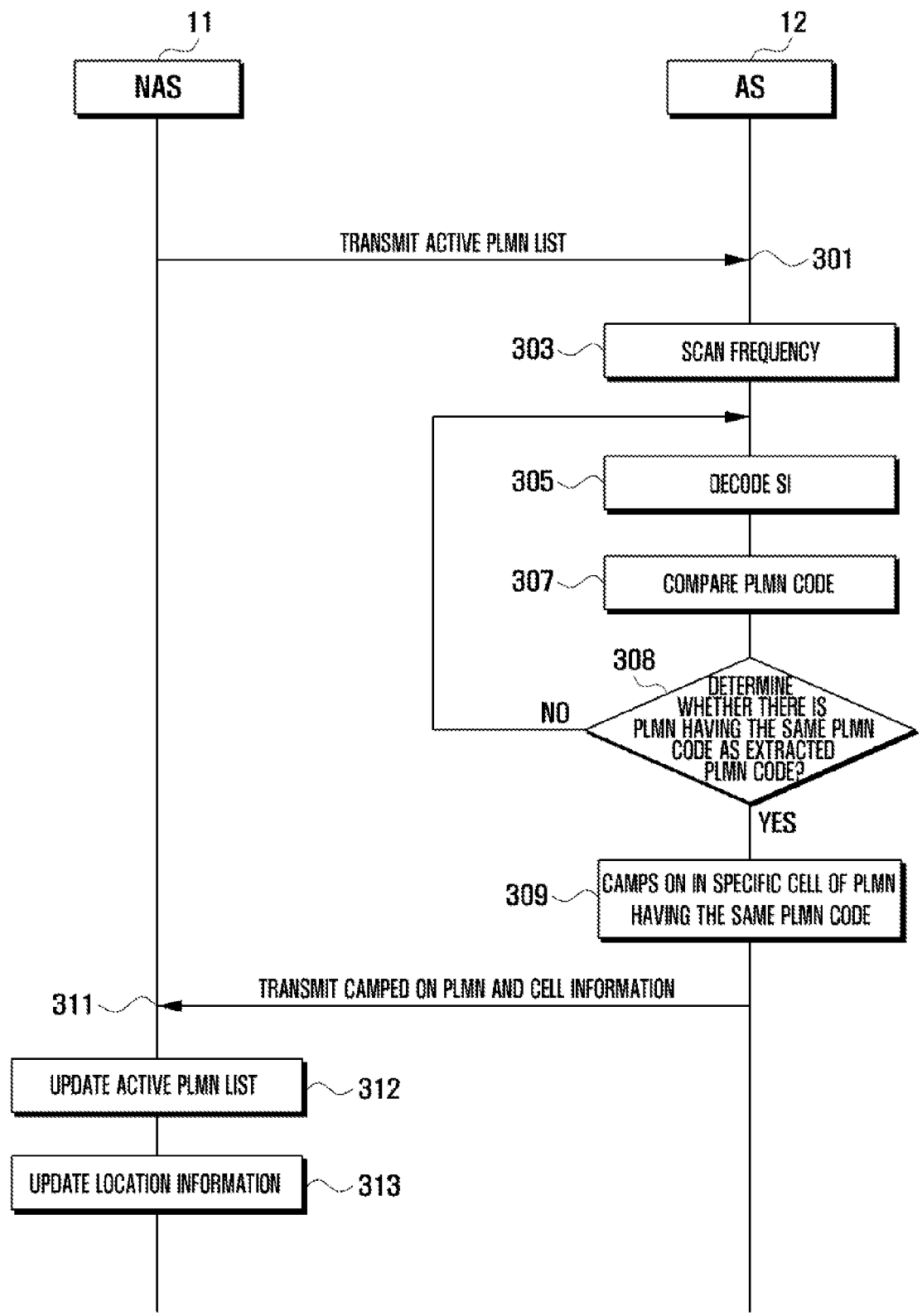
FIG. 3 is a flowchart illustrating a Public Land Mobile Network (PLMN) selection method in a portable terminal according to an exemplary embodiment of the present invention.

FIG. 3 is a flowchart illustrating a PLMN selection method in a portable terminal according to an exemplary embodiment of the present invention.

Hereinafter, it is assumed that the portable terminal 100 is in a Roaming state and in a state where registration is not possible to an RPLMN is not possible, and the Active PLMN list is previously stored in a storage unit 102 or the SIM 60.

Referring to FIG. 1 to FIG. 3, when a PLMN selection event occurs where the portable terminal 100 is Roaming in a state where registration is not possible, a NAS 11 transmits an Active PLMN list to an AS 12 in step 301. When the AS 12 receives the Active PLMN list, the AS 12 may scan frequencies in step 303 and decode SI of a frequency having the largest intensity of a received signal to extract a PLMN code in step 305. The PLMN code may include a Mobile Country Code (MCC) and a Mobile Network Code (MNC).

The AS 12 compares a PLMN code extracted from the SI with a PLMN code included in the Active PLMN list in step 307. The AS 12 may determine whether there is a PLMN having the same PLMN code as the extracted PLMN code in the Active PLMN list in step 308. In the meantime, when the Active PLMN list is configured by PLMNs having the same MCC, the AS 12 may compare only an MNC instead of entire PLMN codes.

When the PLMN does not have the same PLMN code as the extracted PLMN code in the Active PLMN list, the AS 12 returns to step 305. At this time, the AS 12 may decode the SI of a frequency having the largest received signal intensity among remaining frequencies.

In contrast, when there is a PLMN having the same PLMN code as the extracted PLMN code in the Active PLMN list in step 308, the AS 12 may stop the SI decoding and camp on a specific cell having the same PLMN code in step 309. In this case, the AS 12 may attempt the camping on procedure by referring to valid ARFCN information of the Active PLMN list. Meanwhile, registration is not possible in all PLMNs existing in the Active PLMN list and the portable terminal 100 selects a cell having the largest Received Signal Strength Indication (RSSI) in order to change to an emergency call only state.

Upon camping on the specific PLMN through the foregoing procedure, information on the camped on PLMN and cell information (e.g., ARFCN) may be transmitted to a NAS 11 in step 311. When the NAS 11 receives the PLMN information and cell information, the NAS 11 may update the Active PLMN list using the cell information in step 312. In more detail, the NAS 11 may update valid ARFCN information of the Active PLMN list. Further, although not illustrated, the NAS 11 may set the camped on PLMN as the RPLMN.

Subsequently, the NAS 11 may perform a location information update procedure in step 313. The location information update is a procedure that registers a current location of the portable terminal 100 in a Visitor Location Register (VLR) or a Home Location Register (HLR). Since the update procedure depends on a general 3GPP standard, a detailed description thereof is omitted.

Figure 4:
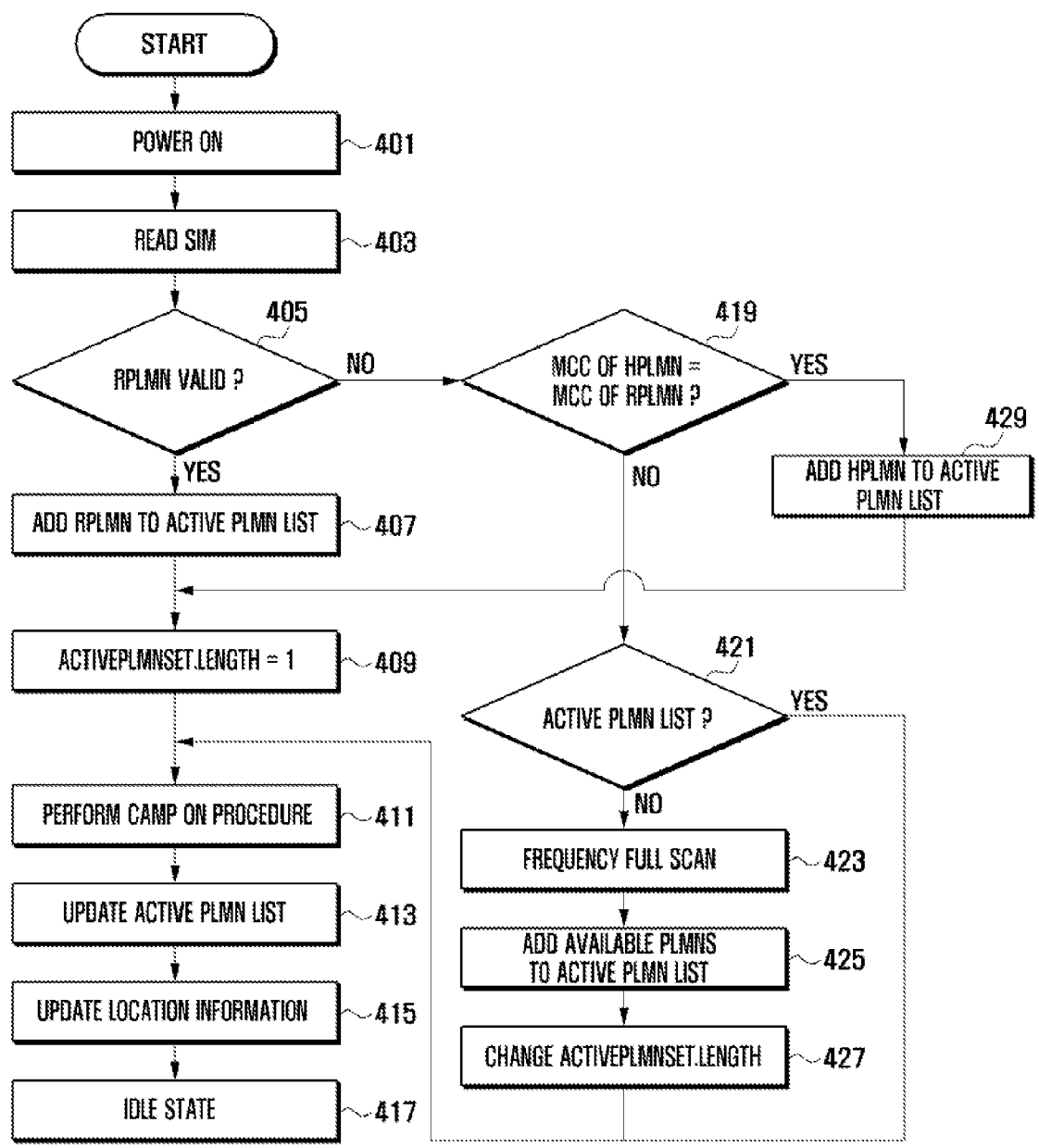
FIG. 4 is a flowchart illustrating a PLMN selection method in a portable terminal at a booting time according to an exemplary embodiment of the present invention.

FIG. 4 is a flowchart illustrating a PLMN selection method in a portable terminal at a booting time according to an exemplary embodiment of the present invention.

Referring to FIG. 1 to FIG. 4, a portable terminal 100 according to an exemplary embodiment of the present invention may power on in step 401. When the portable terminal 100 powers on, a protocol processor 10 of a control unit 110 may read an SIM 60 in step 403. At this time, the protocol processor 10 of the control unit 110 may read subscriber information, information regarding subscribers, the RPLMN, and LOCation Information (LOCI). The RPLMN denotes a PLMN in which the portable terminal 100 is finally registered. The LOCI is an area storing location information, and includes an MCC, an MNC, and a Location Area Code (LAC).

The protocol processor 10 of the control unit 110 may determine whether an RPLMN is in an available valid state in step 405. If it is determined that RPLMN information or LAC information does not exist, the protocol processor 10 of the control unit 110 determines that the RPLMN is invalid. When the RPLMN is valid, the protocol processor 10 of the control unit 110 may add an RPLMN to an Active PLMN list in step 407. In more detail, the NAS 11 of the protocol processor 10 adds an RPLMN to ActivePlmnSet.plmn[0]. Subsequently, the protocol processor 10 of the control unit 110 may set 1 to ActivePlmnSet.length in step 409. The ActivePlmnSet.length indicates the number of PLMNs existing in the Active PLMN list. For example, when the ActivePlmnSet.length is 1, one PLMN exists in the Active PLMN list. Subsequently, the protocol processor 10 may perform a camp on procedure in step 411. In more detail, the NAS 11 of the protocol processor 10 transmits a RR_ACT_REQ including RPLMN information to an AS 12. When the AS 12 receives the RR_ACT_REQ, the AS 12 camps on a specific cell of the RPLMN. After camping on the specific cell, the AS 12 of the protocol processor 10 may transmit a RR_ACT_CNF including a camped on PLMN and cell information to the NAS 11.

Subsequently, the NAS 11 of the protocol processor 10 may update the Active PLMN list in step 413. Updating the Active PLMN list includes procedure mapping a valid ARFCN to the Active PLMN list and storing the mapped result. When a cell changes, the NAS 11 removes the oldest valid ARFCN from the Active PLMN list, moves remaining valid ARFCNs, and adds a new ARFCN to the Active PLMN list.

The NAS 11 of the protocol processor 10 may perform a location information update procedure of the portable terminal 100 in step 415. When the location information update procedure is achieved, the control unit 110 may terminate a booting procedure and change to in an idle state in step 417.

On the other hand, when the RPLMN is invalid in step 405, the protocol processor 10 of the control unit 110 may compare an MCC of an HPLMN with an MCC of an RPLMN in step 419. When the MCC of the HPLMN is identical with the MCC of the RPLMN, namely, when the portable terminal 100 is not in a roaming state, the protocol processor 10 of the control unit 110 adds the HPLMN to the ActivePlmnSet.plmn [0] in step 429 and sets 1 to ActivePlmnSet.length in step 409. The protocol processor 10 substitutes the HPLMN for the RPLMN and performs the steps 411 to 417.

In contrast, when the MCC of the HPLMN differs from the MCC of the RPLMN, namely, when the portable terminal 100 is in the roaming state, the protocol processor 10 may determine whether there is an Active PLMN list in step 421. That is, the control unit 110 may determine whether ActivePlmnSet.length=1. If it is determined that there is an Active PLMN list, namely, ActivePlmnSet.length is not 1, the control unit 110 may perform a camping on procedure in step 411. In more detail, the protocol processor 10 may camp on a specific cell of a specific PLMN among PLMNs stored in the Active PLMN list. Namely, the protocol processor 10 may perform steps 301 to 311 described in FIG. 3.

In contrast, when the Active PLMN list does not exist, that is, when ActivePlmnSet.length=1, the protocol processor 10 of the control unit 110 may perform a procedure in steps 423 to 427 for generating the Active PLMN list. In more detail, when the Active PLMN list does not exist, an AS 12 of the protocol processor 10 may perform a frequency full scan in step 423. The frequency full scan includes a procedure that searches all peripheral available PLMNs to generate an available PLMN list. When the frequency full scan is terminated, the AS 12 of the protocol processor 10 transmits an RR_ACT_REJ including the available PLMN list to the NAS 11. When the NAS 11 receives the RR_ACT_REJ signal, the NAS 11 may add available PLMNs to the Active PLMN list in step 425. In this case, PLMNs having the same MCC as that of the available PLMNs may be stored by referring an MMI PLMN code table.

Subsequently, the NAS 11 may change ActivePlmnSet.length in step 427. The ActivePlmnSet.length may be set as the number of available PLMNs. For example, when the number of available PLMNs is four, the ActivePlmnSet.length may be set to four. As described above, when the protocol processor 10 of the control unit 110 generates the Active PLMN list, the protocol processor 10 may perform a camping on procedure in step 411. That is, the protocol processor 10 may perform steps 301 to 311 as described in FIG. 3.

A PLMN selection method in a portable terminal 100 has been described above. Hereinafter, a PLMN selection method in a portable terminal 100 at the time of generating a no service event will be described.

Figure 5:
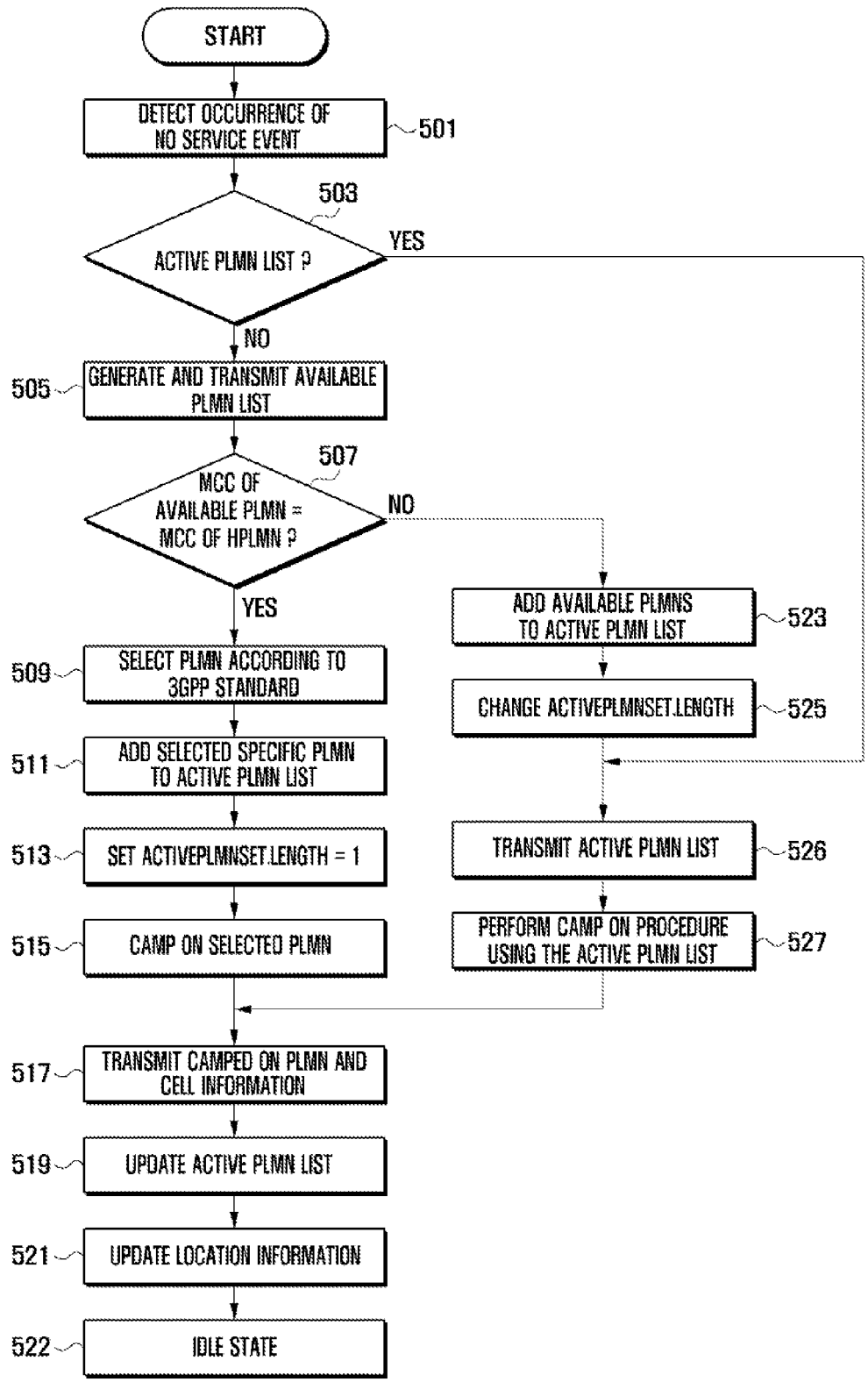
FIG. 5 is a flowchart illustrating a PLMN selection method in a portable terminal when a no service event occurs according to an exemplary embodiment of the present invention.

FIG. 5 is a flowchart illustrating a PLMN selection method in a portable terminal when a no service event occurs according to an exemplary embodiment of the present invention.

Referring to FIG. 5, the protocol processor 10 of a control unit 110 may detect an occurrence of a no service event in step 501. The no service event may occur by any one of the occurrence of a network reject defined in a 3GPP standard, movement from a zone where service is possible (i.e., a zone of weak electric field such as a basement or an elevator) to a zone where service is possible, a location in the zone where service is not possible and movement of another PLMN to a zone where service is possible.

When the no service event occurs, the control unit 110 may determine whether there is an Active PLMN list in step 503. To do this, the control unit 110 may identify ActivePlmnSet.length. If it is determined that there is an Active PLMN list, a protocol processor 10 of the control unit 110 proceeds to step 526. In contrast, if it is determined that the Active PLMN list does not exist, the control unit 110 may scan peripheral frequencies to generate an available PLMN list, and control an AS 11 of a protocol processor 10 to transmit a RR_ACT_REJ including the generated available PLMN list to the NAS 11 in step 505.

When the NAS 11 receives the available PLMN list, the NAS 11 may compare an MCC of an HPLMN with an MCC of the available PLMN list in step 507. When the MCC of the available PLMN list is identical with the MCC of the HPLMN, the NAS 11 may select a specific PLMN according to a 3GPP standard and transmit an RR_ACT_REQ signal including the selected specific PLMN to the AS 12 in step 509. The NAS 11 may add the selected specific PLMN to the Active PLMN list in step 511. That is, the NAS 11 may add the selected specific PLMN to ActivePlmnSet.plmn[0]. The NAS 11 may set 1 as ActivePlmnSet.length in step 513.

The AS 12 may camp on a specific cell of the selected specific PLMN in step 515. When the camping on procedure is achieved, the AS 12 may transmit the camped on PLMN and cell information to the NAS 11 in step 517. At this time, the AS 12 may transmit an RR_ACT_CNF signal including the camped on PLMN and cell information to the NAS 11. When the NAS 11 receives the RR_ACT_CNF signal, the NAS may update an Active PLMN list in step 519. That is, the NAS 11 may update valid ARFCN information of the Active PLMN list using the cell information, and set the camped on specific PLMN as an RPLMN. Subsequently, the NAS 11 may update location information in step 521. After updating the location information, the control unit 110 may change to an idle state in step 522.

In the meantime, when the MCC of the HPLMN is identical with the MCC of the available PLMN list in step 507, the NAS 11 may add the available PLMNs to the Active PLMN list in step 523. At this time, the NAS 11 may further add PLMNs having the same MCC as that of the available PLMNs to the Active PLMN list by referring to an MMI PLMN code table.

The NAS 11 may change the ActivePlmnSet.length in step 525. The ActivePlmnSet.length may be set to the number of available PLMNs. For example, when the number of available PLMNs is 4, the ActivePlmnSet.length may be set to 4.

Subsequently, the NAS 11 may transmit the Active PLMN list to the AS 12 in step 526. When the AS 12 receives the Active PLMN list, the AS 12 may perform a camping on procedure using the Active PLMN list in step 527. That is, the AS 12 may camp on a specific cell of a specific PLMN included in the Active PLMN list. The camping on procedure of the AS 12 was described above in step 303 to step 309 of FIG. 3, thus a detail description thereof is omitted. The AS 12 proceeds to step 517.

Exemplary embodiments of the present invention determines the presence of Roaming when a PLMN selection event occurs, and a frequency selection procedure for HPLMN is omitted when a portable terminal 100 is in a Roaming state, thereby rapidly and efficiently selecting a PLMN for acquisition of a service. When the PLMN is selected, a NAS 11 sets one of available PLMNs as a selected PLMN. The selected PLMN is transferred to the AS 12 to improve a PLMN that sequentially attempts camping on the available PLMNs. Accordingly, when the selected PLMN is transmitted, an Active PLMN list forming PLMNs having the same MCC as that of a PLMN serving in a located zone of a current portable terminal 100 by one package is transferred to the AS 12. Moreover, exemplary embodiments of the present invention may map a valid ARFCN widely used in each PLMN to the Active PLMN list and store the valid ARFCN to increase efficiency by searching stored ARFCN at the time of searching a BCCH. When a user moves to a country, the Active PLMN list is initialized reconfigure the Active PLMN list. That is, exemplary embodiments of the present invention may dynamically manage an Active PLMN list corresponding to the country to rapidly and efficiently select a mobile communication network suitable for the occurrence of a PLMN selection event.

While the invention has been shown and described with reference to certain exemplary embodiments thereof, it will be understood by those skilled in the art that various changes in form and details may be made therein without departing from the spirit and scope of the present invention as defined in the appended claims and their equivalents.

What is claimed is:

1. A Public Land Mobile Network (PLMN) selection method in a roaming portable terminal, the method comprising:
    determining whether a registered PLMN being a finally registered PLMN is valid when a PLMN selection event occurs;
    determining whether an Active PLMN list is stored on the roaming portable terminal when the registered PLMN is invalid;
    selecting a PLMN, which is not a registered PLMN, using the Active PLMN list when the Active PLMN list is stored on the roaming portable terminal; and
    camping on a specific cell of the selected PLMN,
    wherein the Active PLMN list includes PLMNs of a corresponding country in which the roaming portable terminal is located, and is dynamically changed according to country movement of the roaming portable terminal.

2. The method of claim 1, further comprising generating the Active PLMN list when the Active PLMN list is not stored on the roaming portable terminal.

3. The method of claim 2, wherein the generating of the Active PLMN list comprises:
    scanning peripheral frequencies to create an available PLMN list; and
    adding the available PLMN list to the Active PLMN list.

4. The method of claim 3, wherein the generating of the active PLMN list comprises extracting PLMNs including the same Mobile Country Code (MCC) as that of the available PLMNs from a Man Machine Interface (MMI) PLMN code table storing PLMN information by countries and adding the extracted PLMNs to the Active PLMN list.

5. The method of claim 2, wherein the generating of the active PLMN list comprises storing a preset number of a valid Absolute Radio Frequency Channel Number (ARFCN) for each PLMN.

6. The method of claim 1, wherein the selecting of the PLMN using the active PLMN list comprises:
    scanning frequencies;
    decoding System Information (SI) of the scanned frequencies according to a receive signal strength indication to extract a Mobile Network Code (MNC); and
    selecting a PLMN including the same MNC as the extracted MNC.

7. The method of claim 1, further comprising:
    updating an Active PLMN list using the camped on PLMN and cell information; and
    updating location information.

8. The method of claim 1, further comprising initializing the Active PLMN list at the time of country movement.

9. A Public Land Mobile Network (PLMN) selection apparatus in a roaming portable terminal, the apparatus comprising:
    a protocol processor for determining whether a registered PLMN being a finally registered PLMN is valid when a PLMN selection event occurs, for determining whether an Active PLMN list is stored on the roaming portable terminal when the registered PLMN is invalid, for selecting a PLMN, which is not a registered PLMN, using the Active PLMN list when the Active PLMN list is stored on the roaming portable terminal, and for camping on a specific cell of the selected PLMN; and
    a radio frequency communication unit for transmitting a camp on request signal to the specific cell of the selected PLMN,
    wherein the Active PLMN list includes PLMNs of a corresponding country in which the roaming portable terminal is located, and is dynamically changed according to country movement of the roaming portable terminal.

10. The apparatus of claim 9, wherein the protocol processor generates the Active PLMN list when the Active PLMN list is not stored on the roaming portable terminal.

11. The apparatus of claim 10, wherein the protocol processor scans peripheral frequencies to create an available PLMN list, and adds the available PLMN list to the Active PLMN list.

12. The apparatus of claim 11, wherein the protocol processor extracts PLMNs including the same Mobile Country Code (MCC) as that of the available PLMNs from a Man Machine Interface (MMI) PLMN code table storing PLMN information by countries and adds the extracted PLMNs to the Active PLMN list.

13. The apparatus of claim 9, wherein the Active PLMN list comprises a preset number of a valid Absolute Radio Frequency Channel Number (ARFCN) for each PLMN.

14. The apparatus of claim 9, wherein the protocol processor decodes System Information (SI) of the frequencies scanned by the radio frequency communication unit according to a receive signal strength indication to extract a Mobile Network Code (MNC), and selects a PLMN including the same MNC as the extracted MNC.

15. The apparatus of claim 9, wherein the protocol processor updates an Active PLMN list using the camped on PLMN and cell information, and updates location information.

16. The apparatus of claim 9, wherein the protocol processor initializes the Active PLMN list at the time of country movement.

17. The apparatus of claim 9, wherein the protocol processor comprises:
- a non-access stratum for generating the Active PLMN list, for transmitting the Active PLMN list to an access stratum when a PLMN selection event occurs in a roaming state, for updating the Active PLMN list when the portable terminal camps on a specific cell of a specific PLMN, for initializing the Active PLMN list at the time of country movement, and for updating location information; and
- an access stratum for controlling a radio frequency communication to scan frequencies, for decoding System Information (SI) of the scanned frequencies, and for controlling the portable terminal to camp on a specific cell of a specific PLMN included in the Active PLMN list.

\* \* \* \* \*